(12) United States Patent
Dybdahl et al.

(10) Patent No.: US 9,779,176 B2
(45) Date of Patent: Oct. 3, 2017

(54) ACCESSING EXTERNAL FUNCTIONALITY WITHIN A COMPONENT-BASED WEB APPLICATION

(75) Inventors: Eric T. Dybdahl, Seattle, WA (US); James A. Iuliano, Seattle, WA (US); Scott P. Mills, Sammamish, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1322 days.

(21) Appl. No.: 12/061,432

(22) Filed: Apr. 2, 2008

(65) Prior Publication Data

US 2009/0254837 A1    Oct. 8, 2009

(51) Int. Cl.
*G06F 3/048* (2013.01)
*G06F 17/30* (2006.01)
*H04L 29/08* (2006.01)

(52) U.S. Cl.
CPC ........ *G06F 17/30893* (2013.01); *H04L 67/02* (2013.01)

(58) Field of Classification Search
CPC .. G06F 9/4443; G06F 3/04812; G06F 3/0481; H04L 67/00; H04L 67/02
USPC ......... 715/234, 749, 760, 764, 808; 719/311
See application file for complete search history.

(56) References Cited

U.S. PATENT DOCUMENTS

| | | | |
|---|---|---|---|
| 7,757,177 B1 * | 7/2010 | Bohm et al. | 715/760 |
| 2002/0019884 A1 * | 2/2002 | Gungabeesoon | 709/310 |
| 2003/0098887 A1 | 5/2003 | Li | |
| 2006/0036993 A1 | 2/2006 | Buehler et al. | |
| 2006/0117248 A1 | 6/2006 | Kurumai et al. | |
| 2006/0184913 A1 | 8/2006 | Coulthard et al. | |
| 2007/0038956 A1 | 2/2007 | Morris | |
| 2007/0112835 A1 | 5/2007 | McMullen et al. | |
| 2007/0240103 A1 | 10/2007 | Beaton et al. | |
| 2007/0245238 A1 | 10/2007 | Fugitt et al. | |

* cited by examiner

*Primary Examiner* — Rashawn Tillery
(74) *Attorney, Agent, or Firm* — Patterson + Sheridan, LLP (57) ABSTRACT

Embodiments of the invention provide techniques for incorporating functionality of a first web application into a second web application composed and managed by a component-based application framework, such as JSF. For example, the web pages of an existing application may be displayed to the user of a web application composed in the JSF framework, thus enabling the user to access the functionality of the secondary web application in a transparent and seamless manner. Further, the web application may be displayed using AJAX technology, in which page updates are performed asynchronously to user interactions. Embodiments of the invention may allow an application based on a component-based application framework to access functionality of a secondary web application, without requiring the applications to communicate directly.

22 Claims, 5 Drawing Sheets

ACCESSING EXTERNAL FUNCTIONALITY WITHIN A COMPONENT-BASED WEB APPLICATION

BACKGROUND OF THE INVENTION

Field of the Invention

Embodiments of the invention relate to web application frameworks. More specifically, embodiments of the invention provide techniques for incorporating functionality of a first web application into a second web application composed using a component-based application framework.

Description of the Related Art

Various solutions are used for displaying web pages communicated over the Internet. One solution is JavaServer Faces (JSF) technology, which is a server-side web application framework that simplifies the development of user interfaces (UIs). Generally, a JSF application receives a request from a web browser application executing on a client, and responds by generating and sending a web page back to the web browser. The JSF application generates the web page using a set of standard components (e.g., hyperlinks, buttons, forms, etc.). The JSF application may also include specialized libraries called RenderKits, which translate each JSF component into a mark-up language, such as the HyperText Markup Language (HTML). Further, the JSF application performs any processing required by the web page (e.g., handling user interface events, formatting data for display, etc.). Thus, the use of JSF may simplify the process of constructing a web application.

JSF may be used together with AJAX (short for Asynchronous JavaScript and XML) to implement web applications. AJAX is a combination of development techniques that serve to improve the performance of web user interfaces. In particular, AJAX increases the responsiveness and interactivity of web pages by transferring data to and from the web server asynchronously. Using this approach, entire web pages do not have to be reloaded each time there is a need to retrieve data from the web server.

SUMMARY OF THE INVENTION

One embodiment of the invention includes a method which includes receiving, from a client presenting a user with a first web page generated by a first web application, a request for functionality provided by a second web application, generating a redirect script in the first web application; and transmitting the redirect script to the client, which, when invoked by the client performs an operation. The operation may generally include accessing the second web application, presenting one or more interfaces associated with the second web application, transmitting at least one user interaction with one of the interfaces to the second web application, and executing, based on the user interaction, the second web application to produce one or more results. The method may further include receiving, from the second web application, the results of executing the user interaction and transmitting a second web page generated by the first web application to the client for rendering according to the received results.

Another embodiment of the invention includes a computer-readable storage medium containing a program, which when executed on a processor performs an operation. The operation may generally include receiving, from a client presenting a user with a first web page generated by a first web application, a request for functionality provided by a second web application, generating a redirect script in the first web application, and transmitting the redirect script to the client, which, when invoked by the client performs an operation. The operation of the redirect script may generally include accessing the second web application, presenting one or more interfaces associated with the second web application, transmitting at least one user interaction with one of the interfaces to the second web application, and executing, based on the user interaction, the second web application to produce one or more results. The operation of the program may generally further include receiving, from the second web application, the results of executing the user interaction and transmitting a second web page generated by the first web application to the client for rendering according to the received results.

Still another embodiment of the invention includes a system having a processor; and a memory containing a program, which when executed by the processor is configured to perform an operation that includes receiving, from a client presenting a user with a first web page generated by a first web application, a request for functionality provided by a second web application, generating a redirect script in the first web application, and transmitting the redirect script to the client, which, when invoked by the client performs an operation. The redirect script may be configured to perform an operation including accessing the second web application, presenting one or more interfaces associated with the second web application, transmitting at least one user interaction with one of the interfaces to the second web application, and executing, based on the user interaction, the second web application to produce one or more results. The program may be further configured to receive, from the second web application, the results of executing the user interaction and transmit a second web page generated by the first web application to the client for rendering according to the received results.

Still another embodiment of the invention provides a method that includes receiving, from a first web page generated by a first web application, a request for functionality of a second web application, communicating the request to the first web application and generating a redirect script in the first web application. The method may further include transmitting the redirect script to a client, invoking the redirect script in the client, wherein the redirect script is configured to access the second web application and to present one or more interfaces associated with the second web application. The method may still further include presenting the one or more interfaces in the client, receiving, within the client, at least one user interaction with the one or more interfaces, and executing, according to the at least one user interaction, the second web application to produce one or more results. The method may still further include communicating the one or more results to the first web application and rendering a second web page of the first web application according to the communicated one or more results.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are

DETAILED DESCRIPTION OF THE PREFERRED EMBODIMENTS

Generally, JavaServer Faces (JSF) technology supports the generation and display of web pages. In some cases, a JSF application may be developed to replace an existing web application, which may be based on older web technologies. However, the developer may wish to incorporate some portion of the existing application into a new JSF web application. That is, the developer may want to preserve some functionality of the existing application, so as to not have to do the work of replacing the functionality using JSF. However, JSF does not provide the ability to incorporate functionality of existing applications into JSF web pages.

Embodiments of the invention provide techniques for incorporating functionality of a first web application into a second web application composed and managed by a component-based application framework, such as JSF. For example, the web pages of an existing application may be displayed to the user of a web application composed in the JSF framework, thus enabling the user to access the functionality of the secondary web application in a transparent and seamless manner. Further, the web application may be displayed using AJAX technology, in which page updates are performed asynchronously to user interactions. Importantly, embodiments of the invention allow an application based on a component-based application framework to access functionality of a secondary web application, without requiring the applications to communicate directly.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
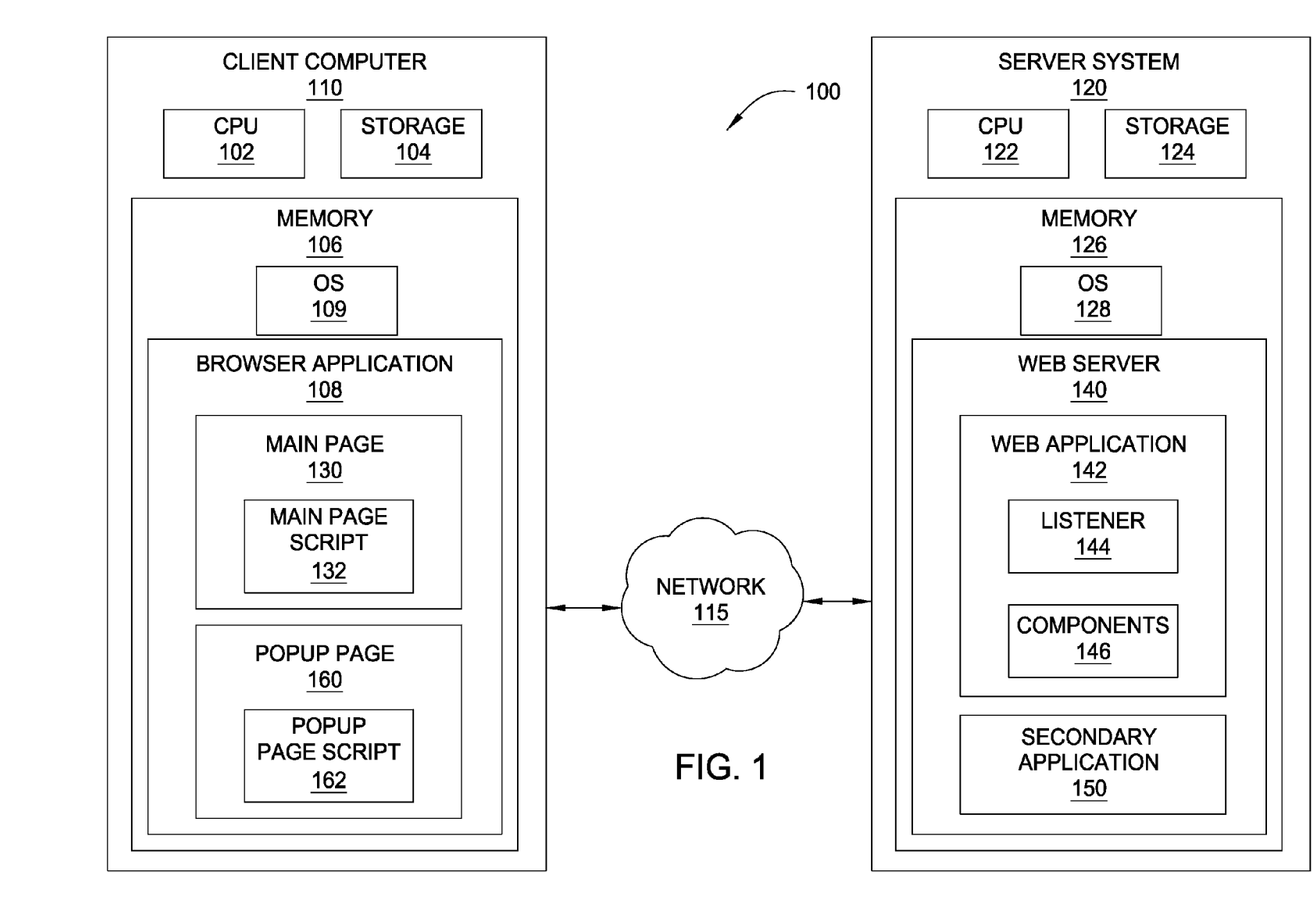
FIG. 1 is a block diagram illustrating a computer system, according to one embodiment of the invention.

FIG. 1 is a block diagram that illustrates a client/server view of a computing environment 100, according to one embodiment of the invention. As shown, computing environment 100 includes client computer 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data from storage 104 and memory 106. CPU 102 is a programmable logic device that performs all the instruction, logic, and mathematical processing in a computer. Storage 104 stores application programs and data for use by client computer 110. Storage 104 may include hard-disk drives, flash memory devices, optical media and the like. Client computer 110 is operably connected to the network 115, which generally represents any kind of data communications network. Accordingly, the network 115 may represent both local and wide area networks, including the Internet. Memory 106 may include an operating system (OS) 109 for managing the operation of the client computer 110. Examples of an OS include UNIX, a version of the Microsoft Windows® operating system, and distributions of the Linux® operating system. (Note, Linux is a trademark of Linus Torvalds in the United States and other countries.)

Memory 106 may also include a browser application 108, which may provide a software application that allows users to view web pages provided by a web server (e.g., web server 140). In one embodiment, the browser application 108 may render both a main page 130 and a popup page 160. Main page 130, when rendered in the browser application 108, may enable a user to interact with a particular web application provided by a web server 140 included in server system 120. For example, the main page 130 may display user interface (UI) elements managed as JSF components in a web application 142 (discussed further below).

In one embodiment, the popup page 160 is a web page that appears in a separate window from the main page 130, and is configured to allow the user to access a secondary web application 150 included in web server 140. Secondary web application 150 may include any existing web application or application framework running on server system 120. For example, secondary web application 150 may be composed using HTML, Apache Struts, ASP, Ruby on Rails, etc.

As shown, main page 130 may include a main page script 132, and popup page 160 may include a popup page script 162. The main page script 132 and popup page script 162 may each represent client-side scripts (e.g., JavaScript) which may be executed by the browser application 108. In one embodiment, main page script 132 and popup page script 162 may be configured to control secondary application 150 directly, thus enabling the browser application 108 to access functionality that is not provided by web application 142.

As shown, server system 120 includes a CPU 122, which obtains instructions and data from memory 126 and storage 124. CPU 122 could be any processor adapted to support the methods of the invention. Storage 124 may include hard-disk drives, flash memory devices, optical media and the like. Memory 126 is any physical memory device sufficiently large to hold the necessary programs and data structures. Memory 126 could be one or a combination of memory devices, including Random Access Memory, non-volatile, (e.g., programmable or flash memories, read-only memories, etc.). Server system 120 may be connected to the network 115.

Illustratively, memory 126 includes an operating system (OS) 128 for managing the operation of the server system 120. The memory 126 may also include web server 140, representing a software application configured to provide web connectivity for remote users (e.g., a user of the client computer 110) via the network 115. As is known, web server 140 may be configured to transmit HTML documents to browser application 108. The HTML documents may then be rendered on the client computer 110. As shown, web server 140 includes web application 142 and secondary application 150. In one embodiment, web application 142 may be based on a component-based web application framework, such as the JavaServer Faces (JSF) framework. For example, web application 142 may be configured to generate web pages using JSF components. Web application 142 may include a listener 144 and components 146. Listener 144 may be an event listener, meaning a software module configured to listen for and react to defined events occurring in the computing environment. For example, a user may interact with interface elements included in main page 130. In response, main page script 132 may generate events that are transmitted to web application 142. Listener 144 may detect the events, and may trigger further actions within web application 142. Components 146 may be JSF components available in web application 142 (e.g., hyperlinks, buttons, forms, actions, etc.).

In one embodiment, the secondary application 150 may be an application providing functionality that is not included in web application 142. For example, secondary application 150 may be a non-JSF web application (e.g., HTML pages accessed via HTTP). As described below with reference to FIGS. 2-5, embodiments of the invention may enable a user of the Web application 142 to access the functionality of the secondary application 150.

Of course, the above description of computing environment 100 is provided for illustrative purposes, and is not intended to be limiting of the scope of the invention. Other embodiments are also contemplated. In one example, functionality described above as part of web application 142 may be replaced by any equivalent web application framework. In another example, secondary application 150 may represent a stand-alone (i.e., not web based) application.

Figure 2:
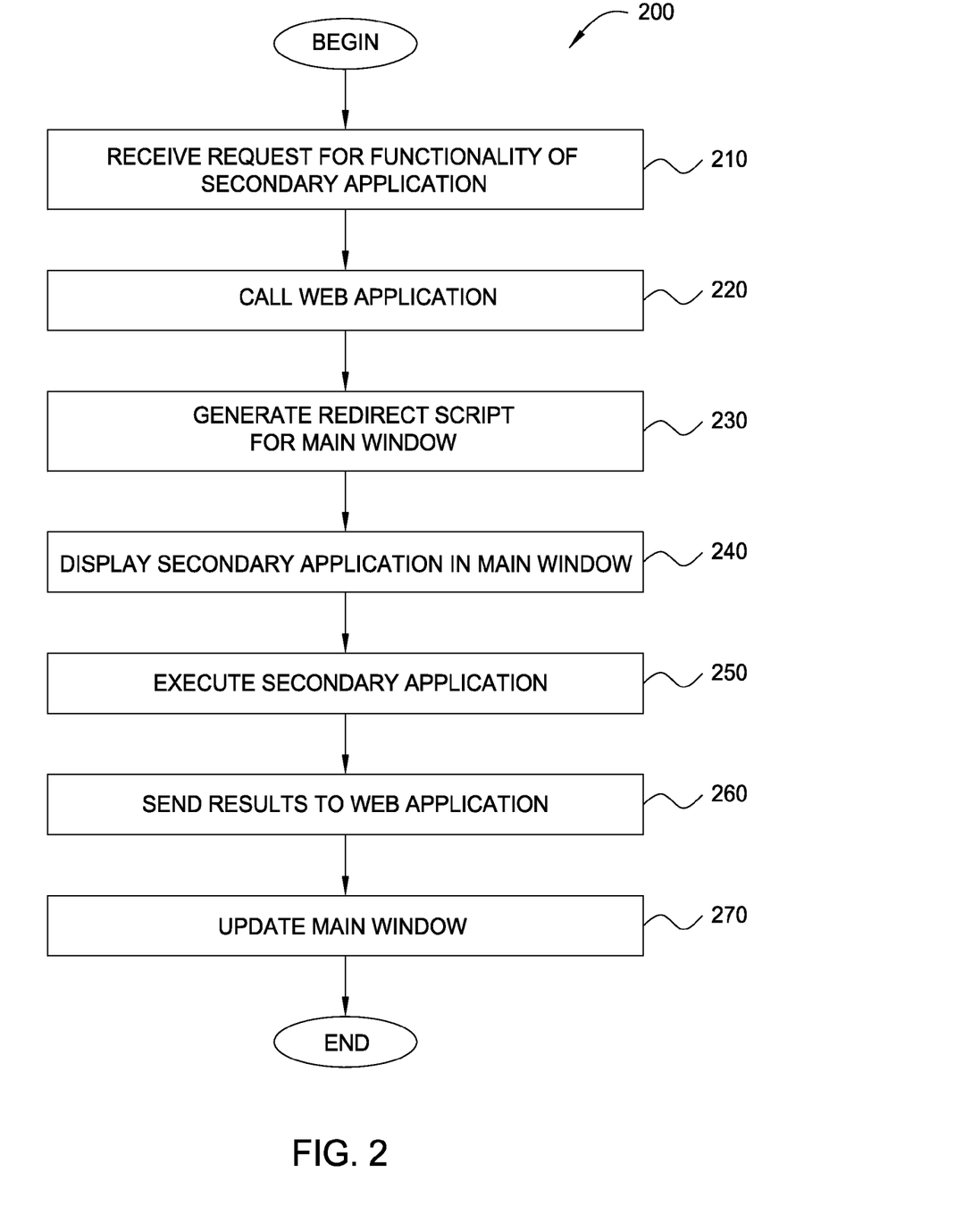
FIG. 2 illustrates a method for providing access to a secondary application within a main page of a web application, according to one embodiment of the invention.

FIG. 2 illustrates a method 200 for providing access to a secondary application within a web page of a web application framework, according to one embodiment of the invention. For the sake of explanation, method 200 is described with reference to elements of FIG. 3, which illustrates a sequence diagram 300 of interactions between software components, according to one embodiment of the invention. However, persons skilled in the art will understand that any system configured to perform the steps of the method 200, in any order, is within the scope of the present invention.

Figure 3:
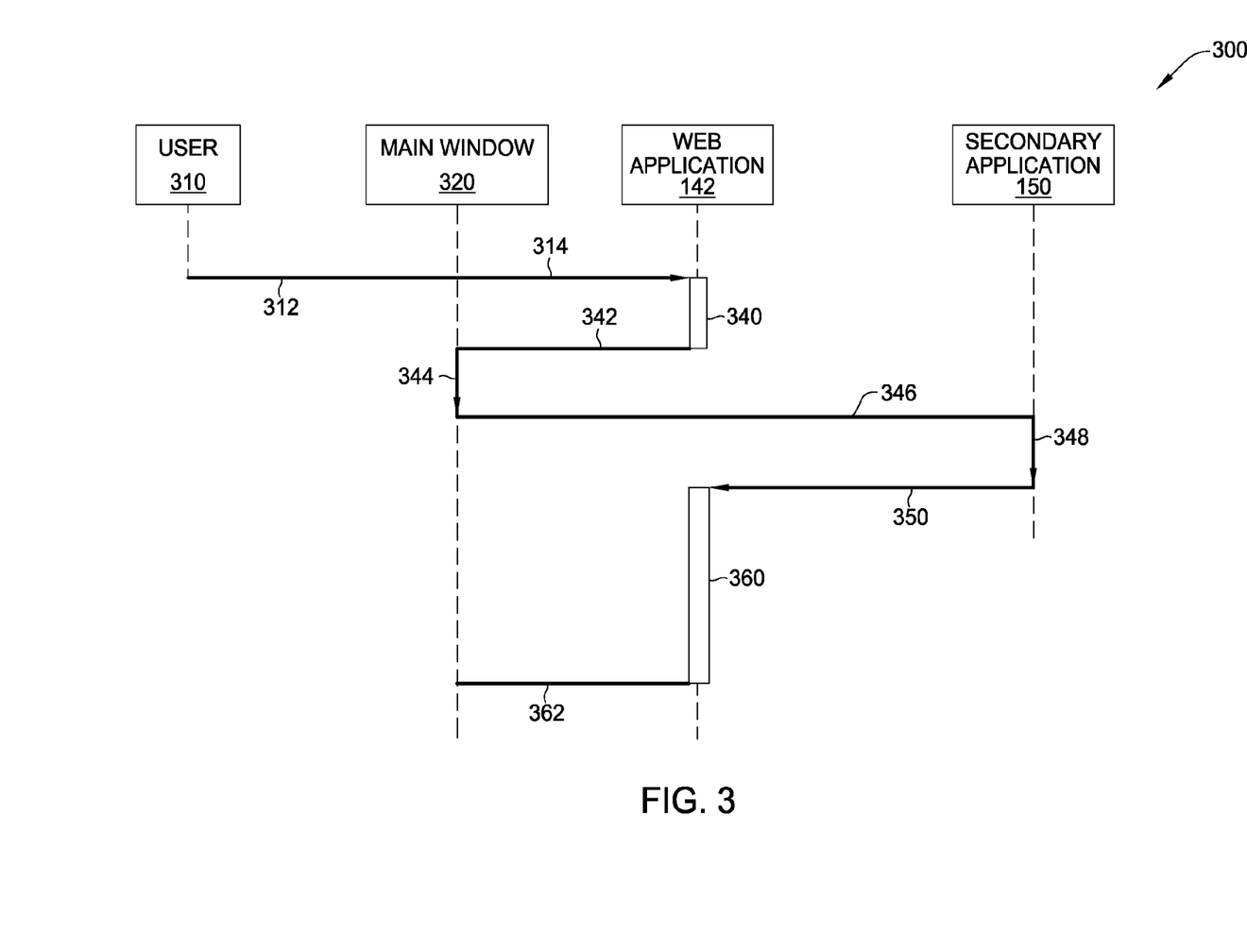
FIG. 3 is a sequence diagram illustrating interactions between software components configured for providing access to a secondary application within a main page of a web application, according to one embodiment of the invention.

As shown in FIG. 2, the method 200 begins at step 210, where a user of a web application requests access to some functionality ultimately provided by a secondary application. The user may make the request by interacting with a web page displayed in a client application. The web page may be generated using a component-based web application framework (e.g., JSF). At step 220, a script included in the web page calls the web application to communicate the request for functionality of the secondary application. For example, as shown in FIG. 3, a user 310 may perform a request action 312, such as clicking on a UI component (e.g., link, button, etc.) displayed in a web page displayed in main window 320 (i.e., main page 130 shown in FIG. 1). In response, a script included in main window 320 (i.e., main page script 132) may then communicate the user request by sending a call message 314 to web application 142. In one embodiment, call message 314 may be an HTTP request.

Referring again to FIG. 2, at step 230, the web application may generate a redirect script for the main window (i.e., main page script 132 shown in FIG. 1). In one embodiment, the redirect script is written in the JavaScript language, and is configured to redirect the main window to the secondary application (i.e., secondary application 150 shown in FIG. 1). Typically, the web application can't access the secondary application. Instead, the redirect script serves to provide the functionality of the secondary application within the user interface of the web application. At step 240, the main window displays the secondary application. For example, as shown in FIG. 3, web application 142 performs a script generation process 340, and then sends the generated script 342 to the main window 320. In one embodiment, web application 142 includes JSF components 146. Thus, the script generation process 340 may occur as part of an event phase of a JSF lifecycle. The generated script 342 is executed (represented by the arrow 344) in main window 320, thus sending a call message 346 to the secondary application 150. In one embodiment, call message 346 may be an HTTP request directed to secondary application 150.

Referring again to FIG. 2, at step 250, the secondary application executes the request. This step may include displaying one or more web pages of the secondary application, as well as receiving user inputs and/or commands in the displayed web pages. At step 260, the results of executing the secondary application (e.g., return parameters, error codes, etc.) are sent to the web application. At step 270, the main window is updated. In one embodiment, this step may include JSF components being used to generate HTML, and transmitting the HTML to the client for rendering. As a result, the displayed web page may be updated to reflect the results of executing the secondary application. After step 270, the method 200 terminates. For example, as shown in FIG. 3, secondary application 150 is executed (represented by arrow 348), which may include user interactions with various web pages of secondary application 150. The execution results 350 are sent to the web application 142. In response, web application 142 performs a page update process 360, and then sends the updated page 362 to the main window 320 for display to the user. In one embodiment, the page update process 360 is performed as part of an event phase of a JSF lifecycle. As described, embodiments of the invention allow an application based on a component-based application framework to access functionality of a secondary web application, without requiring the applications to communicate directly.

Figure 4:
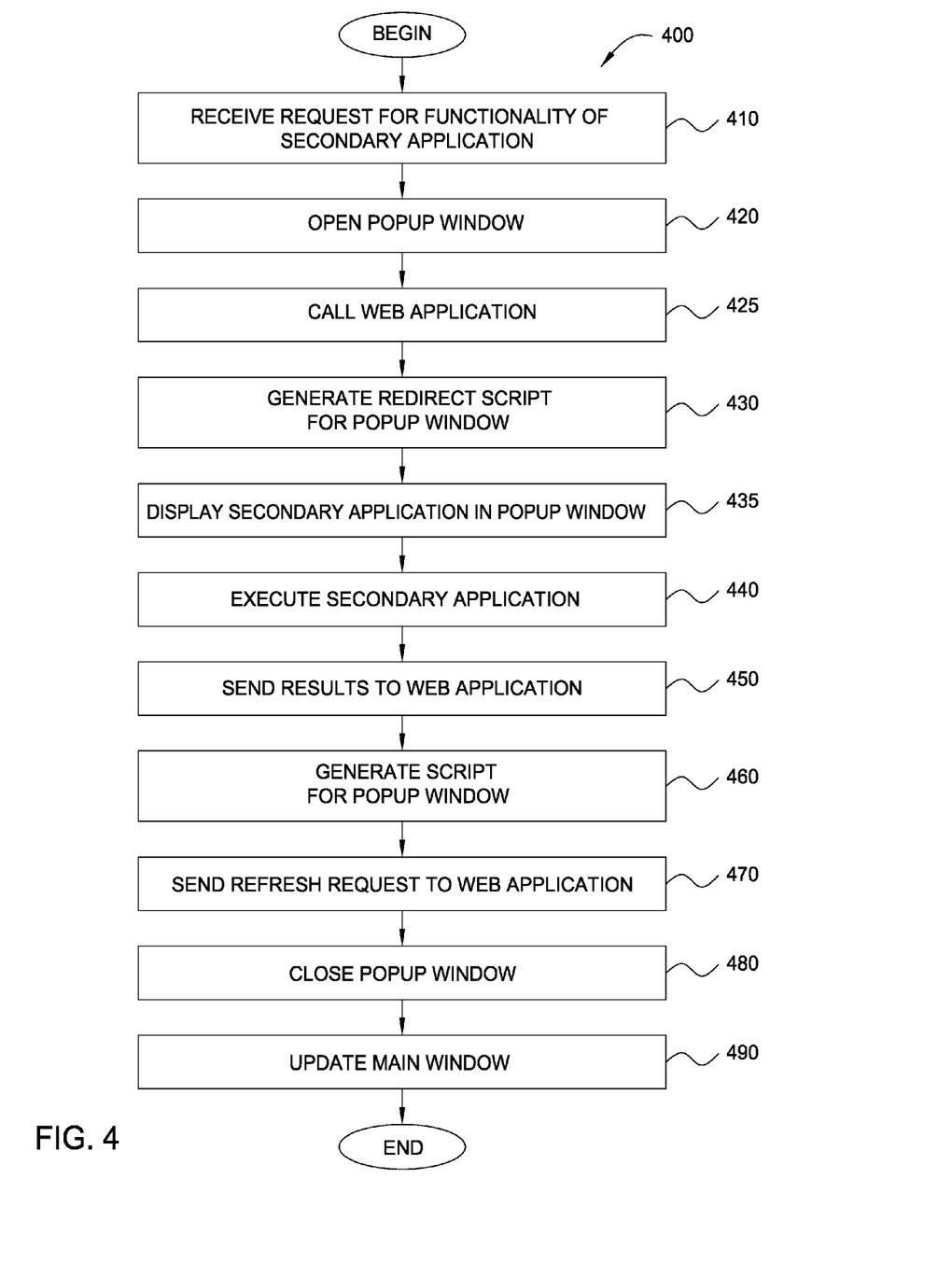
FIG. 4 illustrates a method for providing access to a secondary application within a secondary window of a web application, according to one embodiment of the invention.

FIG. 4 illustrates a method 400 for providing access to a secondary application within a secondary window of a web application, according to one embodiment of the invention. For the sake of explanation, method 400 is described below with reference to FIG. 5, which illustrates a sequence diagram 500 illustrating interactions between software components, according to one embodiment of the invention. However, persons skilled in the art will understand that any system configured to perform the steps of the method 400, in any order, is within the scope of the present invention.

The user may make the request by interacting with a web page displayed in a client application. The web page may be generated using a component-based web application framework (e.g., JSF).

Figure 5:
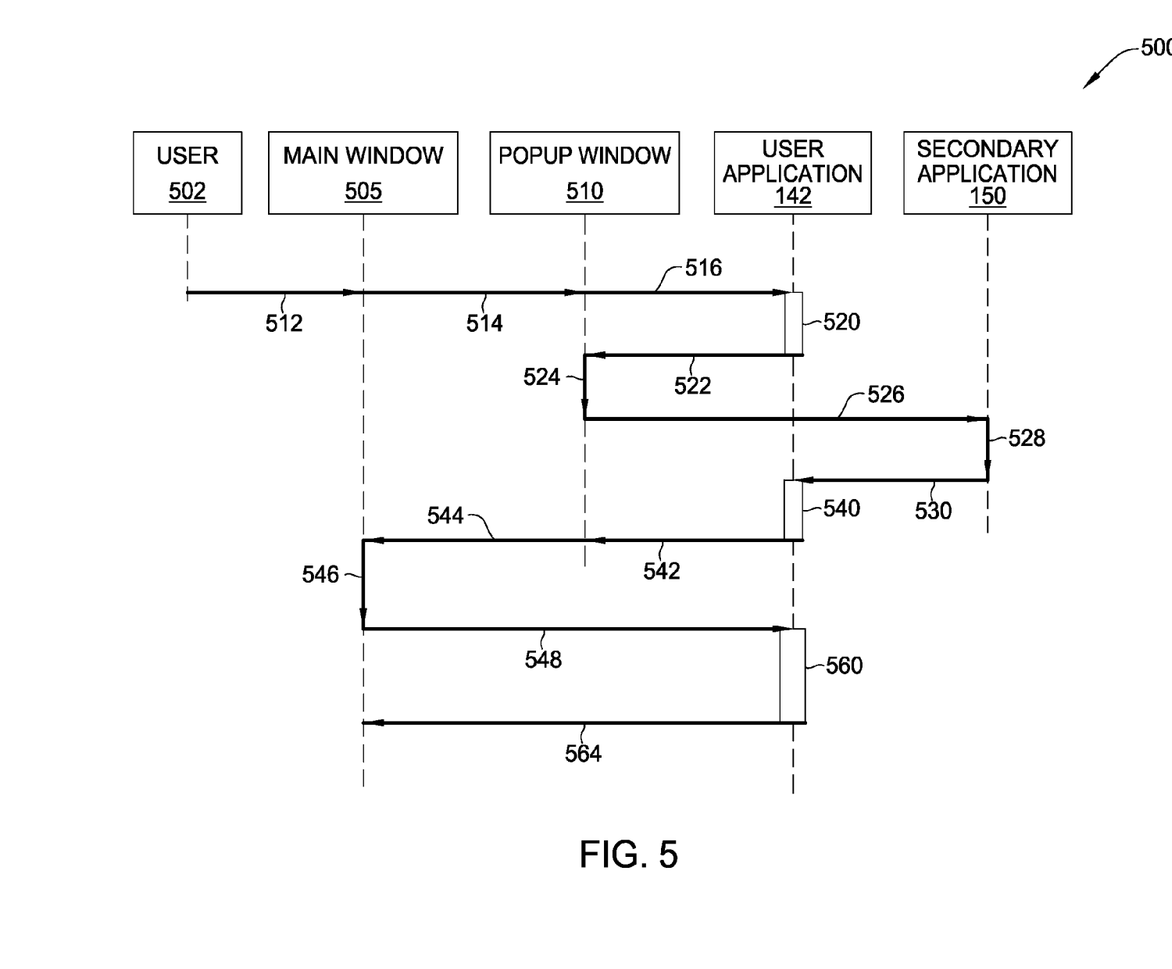
FIG. 5 is a sequence diagram illustrating interactions between software components configured for providing access to a secondary application within a secondary window of a web application, according to one embodiment of the invention.

As shown in FIG. 4, the method 400 begins at step 410, where a user of a web application requests access to some functionality ultimately provided by a secondary application (e.g., secondary application 150). The user may make the request by interacting with a web page displayed in a client application. The web page may be generated using a component-based web application framework (e.g., JSF). At step 420, a script included in the web page may open a popup window to present a popup page (e.g., popup page 130 shown in FIG. 1). In one embodiment, a user may interact with the secondary application using the popup page. At step 425, a script included in the popup window may call a web application to communicate the request for functionality of the secondary application. For example, as shown in FIG. 5, a user 502 may perform a request action 512, such as clicking on a link or button displayed in a web page displayed in main window 505 (e.g., main page 130 shown in FIG. 1). In response, a script included in main window 505 (e.g., main page script 132) may open a popup window 510 (represented by arrow 514) to provide access to the secondary application. A script included in the popup window 510 (e.g., popup page script 162) may then send a call message 516 to notify web application 142 of the request for functionality of secondary application 150. Web application 142 may be composed using the JSF application framework. In one embodiment, call message 516 may be an HTTP request directed to secondary application 150.

Referring again to FIG. 4, at step 430, the web application may generate a redirect script for the popup window. In one embodiment, the redirect script is written in the JavaScript language, and is configured to redirect the popup window to the secondary application (e.g., popup page script 162 shown in FIG. 1). At step 435, the popup window displays content received from the secondary application. For example, as shown in FIG. 5, web application 142 performs a script generation process 520, and then sends the generated script 522 to the popup window 510. In one embodiment, the script generation process 520 occurs as part of an event phase of a JSF lifecycle. The generated script 522 is executed (represented by the arrow 524) in popup window 510, thus sending a call message 526 to the secondary application 150. In one embodiment, call message 526 may be an HTTP request directed to secondary application 150.

Referring again to FIG. 4, at step 440, the secondary application executes according to the received request. This step may include displaying one or more web pages of the secondary application in the popup window, as well as receiving user inputs and/or commands in the displayed web pages. At step 450, the results of executing the secondary application (e.g., return parameters, error codes, etc.) are sent to the web application (e.g., web application 142). At step 460, the web application may generate a script to be executed in the popup window. The generated script may be written in the JavaScript language (e.g., popup page script 162 shown in FIG. 1). For example, as shown in FIG. 5, secondary application 150 is executed (represented by arrow 528), which may include user interactions with various web pages of secondary application 150. The execution results 530 are sent to web application 142. In response, web application 142 performs script generation process 540, and then sends the generated script 522 to the popup window 510. In one embodiment, the script generation process 540 is part of an event phase of a JSF lifecycle.

Referring again to FIG. 4, at step 470, the generated script, when executed in the popup window, sends a refresh message to the main window, which in response sends a refresh request to the web application. In one embodiment, the refresh request is an asynchronous data request (e.g., a data request composed using AJAX techniques). At step 480, the script executing in the popup window closes the popup window. At step 490, the main window is updated.

This step may include displaying the initial web page of the web application, which may be updated to reflect the results of executing the secondary application. After step 490, the method 400 terminates. For example, as shown in FIG. 5, main window 505 may receive a refresh message 544 indicating that the main window 505 may be refreshed. In response, main window 505 performs process 546 to generate a refresh request 548, which is sent to the web application 142. In response, web application 142 performs a page update process 560, and then sends a page update 564 to the main window 505 for display to the user. In one embodiment, page update process 560 is part of an event phase of a JSF lifecycle. Further, page update 564 may represent an AJAX update, meaning only those JSF components of the web page displayed in main window 505 that are affected by the secondary application execution (arrow 528) are refreshed.

As described, embodiments of the invention may allow an application based on a component-based application framework to access functionality of a secondary web application, without requiring the applications to communicate directly. Of course, the above examples are provided for illustrative purposes only, and are not intended to be limiting of the invention. It is contemplated that the steps of method 200 and method 400 may be performed in a different order or combination, depending on the application. Further, the systems illustrated in FIGS. 1, 3 and 5 may be modified to incorporate other software objects. Furthermore, while web application 142 is described in terms of the JSF framework, this is merely for purposes of explanation. It is contemplated that web application 142 may be composed using any equivalent web application frameworks. Such modifications may be made to suit particular situations, and are thus contemplated to be in the scope of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method to incorporate external functionality within component-based web applications, without requiring intra-application communication, the computer-implemented method comprising:
receiving, by a first web application and from a client presenting a user with a first web page generated by the first web application composed based on a predefined framework for composing component-based web applications, a request for functionality of a second web application different from the first web application, wherein the first application includes an event listener component, wherein the second application is not composed based on the predefined framework; and
generating, by the first web application when executed by operation of one or more computer processors, and without involving the predefined framework, a redirect script to the client to invoke, via a call message, the functionality of the second web application in order to incorporate the functionality into the first web application in a manner not natively supported by the predefined framework, wherein the redirect script is expressed in a predefined scripting language, whereupon the client is configured to:
invoke the redirect script, whereupon the redirect script is configured to:
(i) access the second web application;
(ii) present, in the client, one or more interfaces associated with the second web application; and
(iii) transmit the call message to the second web application, wherein at least one user interaction with the one or more interfaces is transmitted to the second web application;
execute the second web application based on the at least one user interaction with the one or more interfaces, in order to produce one or more results provided by the invoked functionality based on the at least one user interaction, wherein the at least one user interaction is transmitted by the redirect script to the second web application, wherein the one or more results are selected from one or more return parameters and one or more error codes;
communicate the one or more results to the first web application; and
render a second web page of the first web application asynchronously with any user interactions with the client, including refreshing only components in the first web application that are affected by the second application, wherein the second web page includes the one or more results;
wherein the functionality of the second web application is incorporated into the first web application without requiring any communication between the first and second web applications beyond transmission of the redirect script and the one or more results.

2. The computer-implemented method of claim 1, wherein the first web application is composed using the JavaServer Faces framework.

3. The computer-implemented method of claim 1, wherein presenting the one or more interfaces is performed in a main window of the first web application, wherein the second web page is rendered in the main window.

4. The computer-implemented method of claim 1, wherein presenting the one or more interfaces is performed in a popup window displayed separately from a main window of the first web application, wherein the second web page is rendered in the main window.

5. The computer-implemented method of claim 1, wherein the redirect script is composed in the JavaScript language.

6. The computer-implemented method of claim 1, wherein the second web page is, using asynchronous JavaScript and Extensible Markup Language (AJAX), rendered asynchronously to any user interactions with the client.

7. The computer-implemented method of claim 1, wherein the predefined framework comprises the JavaServer Faces (JSF) framework, wherein the redirect script is composed in a predefined scripting language, wherein the predefined scripting language comprises the JavaScript language, wherein the second web page is, using asynchronous JavaScript and Extensible Markup Language (AJAX), rendered asynchronously with any user interactions with the client, wherein only JSF components in the first web application and affected by the second application are refreshed using AJAX, wherein the call message comprises a Hypertext Transfer Protocol request.

8. The computer-implemented method of claim 7, wherein the one or more interfaces are presented, in respective instances: (i) in a main window of the first web application, in which case the second web page is rendered in the main window; and (ii) in a popup window displayed separately from a main window of the first web application, in which case the second web page is rendered in the main window.

9. The computer-implemented method of claim 8, wherein the one or more results include one or more return parameters and one or more error codes, wherein the second web page is generated by updating the first web page during an event phase of a JSF lifecycle adopted by the first web application when handling the request for functionality, wherein the first web page is updated to reflect the one or more results produced from executing the second web application.

10. The computer-implemented method of claim 9, wherein receiving, from the second web application, the one or more results provided by the requested functionality of the second web application comprises:
generating, based on the one or more results, a second script in the first web application; and
invoking the second script within the popup window, wherein the second script is configured to perform an operation comprising: (i) sending the one or more results to the first web application; and (ii) closing the popup window.

11. A computer program product to incorporate external functionality within component-based web applications, without requiring intra-application communication, the computer program product comprising:
a computer-readable storage medium having computer-readable program code of a first web application embodied therewith, the computer-readable program code executable by one or more computer processors to perform an operation comprising:
receiving, by the first web application and from a client presenting a user with a first web page generated by the first web application composed based on a predefined framework for composing component-based web applications, a request for functionality of a second web application different from the first web application, wherein the first application includes an event listener component, wherein the second application is not composed based on the predefined framework; and
generating, by the first web application and without involving the predefined framework, a redirect script to the client to invoke, via a call message, the functionality of the second web application in order to incorporate the functionality into the first web application in a manner not natively supported by the predefined framework, wherein the redirect script is expressed in a predefined scripting language, whereupon the client is configured to:
invoke the redirect script, whereupon the redirect script is configured to:
(i) access the second web application;
(ii) present, in the client, one or more interfaces associated with the second web application; and
(iii) transmit the call message to the second web application, wherein at least one user interaction with the one or more interfaces is transmitted to the second web application;
execute the second web application based on the at least one user interaction with the one or more interfaces, in order to produce one or more results provided by the invoked functionality based on the at least one user interaction, wherein the at least one user interaction is transmitted by the redirect script to the second web application, wherein the one or more results are selected from one or more return parameters and one or more error codes;
communicate the one or more results to the first web application; and
render a second web page of the first web application asynchronously with any user interactions with the client, including refreshing only components in the first web application that are affected by the second application, wherein the second web page includes the one or more results;
wherein the functionality of the second web application is incorporated into the first web application without requiring any communication between the first and second web applications beyond transmission of the redirect script and the one or more results.

12. The computer program product of claim 11, wherein the first web application is composed using the JavaServer Faces framework.

13. The computer program product of claim 11, wherein presenting the one or more interfaces is performed in a main window of the first web application, and wherein the second web page is rendered in the main window.

14. The computer program product of claim 11, wherein presenting the one or more interfaces is performed in a popup window displayed separately from a main window of the first web application, and wherein the second web page is rendered in the main window.

15. The computer program product of claim 11, wherein the redirect script is composed in the JavaScript language.

16. The computer program product of claim 11, wherein the second web page is, using asynchronous JavaScript and Extensible Markup Language (AJAX), rendered asynchronously to any user interactions with the client.

17. A system to incorporate external functionality within component-based web applications, without requiring intra-application communication, the system comprising:
one or more computer processors; and
a memory containing code of a first web application, wherein the code is executable by the one or more computer processors to perform an operation comprising:
receiving, by the first web application and from a client presenting a user with a first web page generated by the first web application composed based on a predefined framework for composing component-based web applications, a request for functionality of a second web application different from the first web application, wherein the first application includes an event listener component, wherein the second application is not composed based on the predefined framework; and
generating, by the first web application without involving the predefined framework, a redirect script to the client to invoke, via a call message, the functionality of the second web application in order to incorporate the functionality into the first web application in a manner not natively supported by the predefined framework, wherein the redirect script is expressed in a predefined scripting language, whereupon the client is configured to:
invoke the redirect script, whereupon the redirect script is configured to:
(i) access the second web application;
(ii) present, in the client, one or more interfaces associated with the second web application; and (iii) transmit the call message to the second web application, wherein at least one user interaction with the one or more interfaces is transmitted to the second web application;

execute the second web application based on the at least one user interaction with the one or more interfaces, in order to produce one or more results provided by the invoked functionality based on the at least one user interaction, wherein the at least one user interaction is transmitted by the redirect script to the second web application, wherein the one or more results are selected from one or more return parameters and one or more error codes;

communicate the one or more results to the first web application; and render a second web page of the first web application asynchronously with any user interactions with the client, including refreshing only components in the first web application that are affected by the second application, wherein the second web page includes the one or more results;

wherein the functionality of the second web application is incorporated into the first web application without requiring any communication between the first and second web applications beyond transmission of the redirect script and the one or more results.

18. The system of claim 17, wherein the first web application is composed using the JavaServer Faces framework.

19. The system of claim 17, wherein presenting the one or more interfaces is performed in a main window of the first web application, and wherein the second web page is rendered in the main window.

20. The system of claim 17, wherein presenting the one or more interfaces is performed in a popup window displayed separately from a main window of the first web application, and wherein the second web page is rendered in the main window.

21. The system of claim 17, wherein the redirect script is composed in the JavaScript language.

22. The system of claim 17, wherein the second web page is, using asynchronous JavaScript and Extensible Markup Language (AJAX), rendered asynchronously to any user interactions with the client.

* * * * *